US012519249B2

(12) United States Patent
Tanji

(10) Patent No.: US 12,519,249 B2
(45) Date of Patent: Jan. 6, 2026

(54) ARRAY ANTENNA SUBSTRATE AND APPARATUS ANTENNA APPARATUS

(71) Applicant: NEC Corporation, Tokyo (JP)

(72) Inventor: Koki Tanji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 275 days.

(21) Appl. No.: 18/182,942

(22) Filed: Mar. 13, 2023

(65) Prior Publication Data

US 2023/0299504 A1 Sep. 21, 2023

(30) Foreign Application Priority Data

Mar. 17, 2022 (JP) ................................ 2022-043136

(51) Int. Cl.
*H01Q 21/22* (2006.01)
*H01Q 21/06* (2006.01)
*H01Q 21/08* (2006.01)

(52) U.S. Cl.
CPC ........... *H01Q 21/22* (2013.01); *H01Q 21/062* (2013.01); *H01Q 21/08* (2013.01)

(58) Field of Classification Search
CPC ............... H01Q 21/0025; H01Q 21/06; H01Q 21/061; H01Q 21/08; H01Q 21/10; H01Q 21/12; H01Q 21/22; H01Q 21/28; H01Q 21/29
See application file for complete search history.

(56) References Cited

U.S. PATENT DOCUMENTS 10,025,960 B1 * 7/2018 Fink .......................... H04L 5/08
10,084,516 B2 * 9/2018 Le-Ngoc .............. H04B 7/0452
11,038,474 B2 * 6/2021 Khalil .................... H04B 17/12
11,218,203 B1 * 1/2022 Lee ...................... H04B 7/0617
2010/0311353 A1 * 12/2010 Teillet ................ H01Q 15/0046 455/84
2014/0210666 A1 * 7/2014 Maltsev .................. H01Q 3/40 343/893
2015/0236425 A1 * 8/2015 Sudo ........................ H01Q 9/42 343/700 MS (Continued)

FOREIGN PATENT DOCUMENTS

JP 2004-179738 A 6/2004
JP 2009-159430 A 7/2009

OTHER PUBLICATIONS

JP Office Action for JP Application No. 2022-043136, malled on Aug. 26, 2025 with English Translation.

*Primary Examiner* — Jason M Crawford

(57) ABSTRACT

In order to provide a technique for increasing practicality of an array antenna apparatus, included are: a base body (11) extending parallel to a Z-X plane in an orthogonal coordinate system X-Y-Z; a plurality of first antenna elements (21L), arranged on an edge of the X-directional side of one surface of the base body, and configured to emit a radio wave at least in the X-direction; a plurality of second antenna elements (21R), arranged on an edge of the X-directional side of the other surface of the base body, and configured to emit a radio wave at least in the X-direction. The plurality of first antenna elements is arranged in the Z-direction, the plurality of second antenna elements is arranged in the Z-direction, and the first antenna elements and the second antenna elements are located alternately viewed in the Z-direction.

14 Claims, 12 Drawing Sheets

(56) References Cited

U.S. PATENT DOCUMENTS

| | | | | |
|---|---|---|---|---|
| 2017/0117612 | A1* | 4/2017 | Toyao | H01Q 1/24 |
| 2018/0062271 | A1* | 3/2018 | Toyao | H01Q 9/30 |
| 2019/0036215 | A1* | 1/2019 | Shahmohammadian | H01Q 3/40 |
| 2020/0303837 | A1* | 9/2020 | Anderson | H01Q 3/247 |
| 2021/0263124 | A1* | 8/2021 | Kenington | H04B 7/0617 |
| 2021/0265741 | A1* | 8/2021 | Kenington | H01Q 21/24 |
| 2021/0266051 | A1* | 8/2021 | Kenington | H01Q 3/2605 |
| 2021/0270926 | A1* | 9/2021 | Kenington | G01S 3/043 |
| 2022/0045424 | A1* | 2/2022 | Sato | H01Q 25/00 |
| 2023/0299504 | A1* | 9/2023 | Tanji | H01Q 21/22<br>343/702 |
| 2024/0291166 | A1* | 8/2024 | Sato | H01Q 1/38 |
| 2024/0304994 | A1* | 9/2024 | Onaka | H01Q 1/38 |
| 2025/0253544 | A1* | 8/2025 | Zhu | H01Q 23/00 |

* cited by examiner

ARRAY ANTENNA SUBSTRATE AND APPARATUS ANTENNA APPARATUS

CROSS-REFERENCES TO RELATED APPLICATION

The present application claims priority to Japanese patent application No. JP 2022-43136 filed on Mar. 17, 2022, the content of which is hereby incorporated by reference in its entirety.

BACKGROUND

Technical Field

The present disclosure relates to an array antenna substrate and an array antenna apparatus.

Background Art

Recently, array antenna apparatuses capable of emitting radio waves having directivity have been developed as antenna apparatuses used for a base station and the like. PTL 1 proposes an example of an array antenna apparatus configured by arranging a plurality of antenna elements.

[PTL 1] JP 2009-159430 A

SUMMARY

An array antenna apparatus needs to, while suppressing grating lobe, increase antenna gain. Hence, it is considered that the interval between antenna elements is made equal to a distance half the wavelength of radio waves emitted from the antenna elements, for example.

Meanwhile, in a case of millimeter waveband or a terahertz waveband, the length of radio waves is extremely short. As a concrete example, the wavelength of radio waves of 150 GHz is approximately 2 mm. Thus, in a case of dealing with radio waves of 150 GHz in a millimeter waveband or a terahertz waveband, the interval between the antenna elements of the array antenna apparatus is approximately equal to a distance half the wavelength of radio waves, i.e., approximately 1 mm, in some cases. Hence, such an array antenna apparatus is susceptible to improvement in practicality including reduction of the interval between the antenna elements, for example.

The present disclosure provides a technique for increasing practicality of an array antenna apparatus.

Solution to Problem

According to one example aspect of the present invention, an array antenna substrate includes: a base body extending parallel to a Z-X plane in an orthogonal coordinate system X-Y-Z; a plurality of first antenna elements, arranged on an edge of the X-directional side of one surface of the base body, and configured to emit a radio wave at least in the X-direction; a plurality of second antenna elements, arranged on an edge of the X-directional side of the other surface of the base body, and configured to emit a radio wave at least in the X-direction, wherein the plurality of first antenna elements is arranged in the Z-direction, the plurality of second antenna elements is arranged in the Z-direction, and the first antenna elements and the second antenna elements are located alternately viewed in the Z-direction.

Advantageous Effects of Invention

According to one example aspect of the present invention, the technique can increase practicality of an array antenna apparatus. Note that, according to the present invention, instead of or together with the above effects, other effects may be exerted.

DESCRIPTION OF THE EXAMPLE EMBODIMENTS

Hereinafter, one or more example embodiments will be described in detail with reference to the accompanying drawings. Note that, in the Specification and drawings, elements to which similar descriptions are applicable are denoted by the same reference signs, and overlapping descriptions are hence omitted.

Descriptions will be given in the following order.

1. Overview of Example Embodiments
2. First Example Embodiment
   - 2-1. Configuration of Antenna Apparatus
   - 2-2. Configuration of Antenna Substrate
   - 2-3. Effects
   - 2-4. Example Alterations
3. Second Example Embodiment

1. Overview of Example Embodiments

Beamforming, which is a technique related to the present example embodiment, will be described with reference to FIG. 1.

Figure 1:
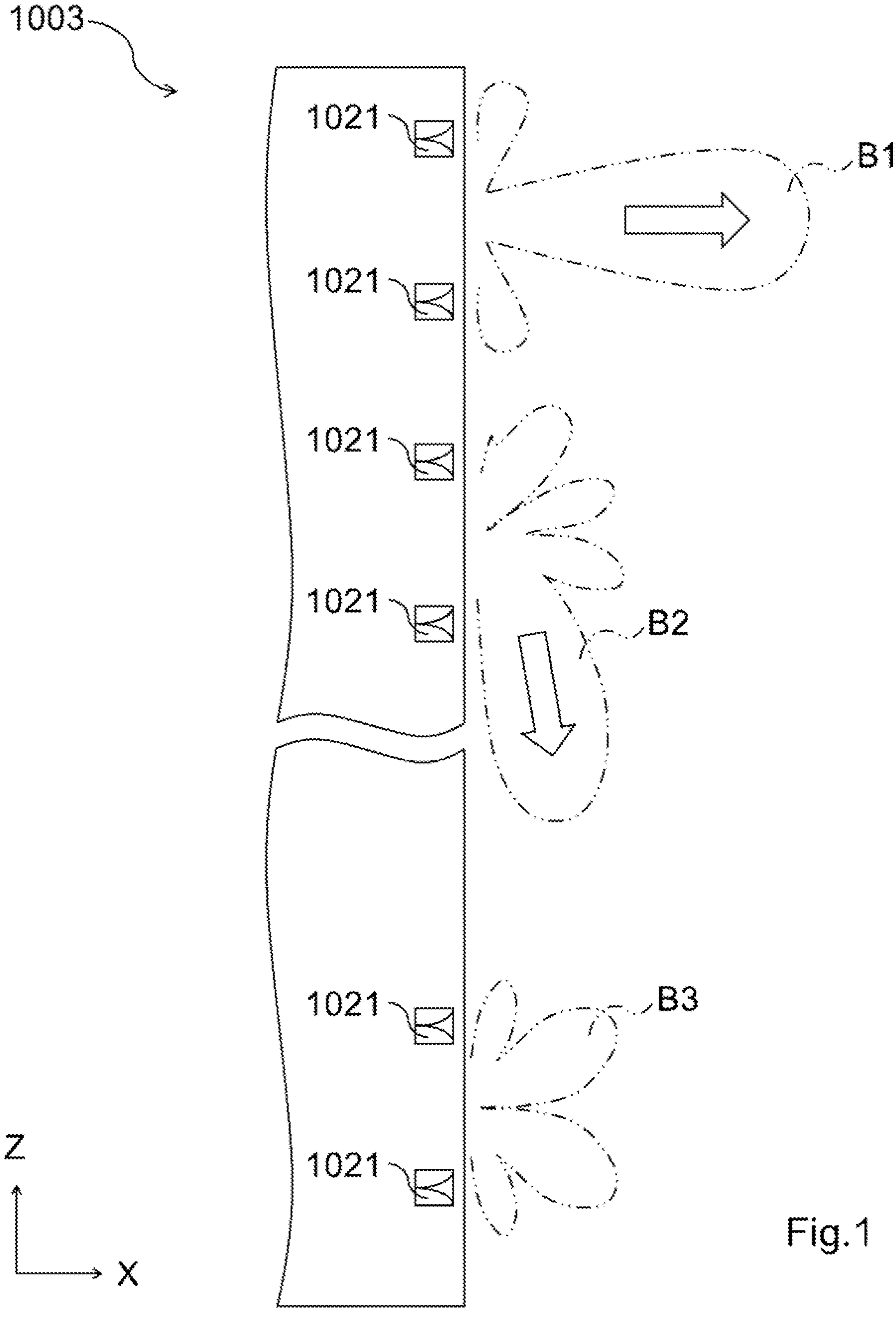
FIG. 1 is a Z-X plane view illustrating an example of antenna elements in an array antenna apparatus.

FIG. 1 is a Z-X plane view illustrating an example of antenna elements 1021 in an array antenna apparatus. The array antenna apparatus includes a plurality of antenna substrates 1003. The antenna substrates 1003 are each a linear antenna array including the plurality of antenna elements 1021. The antenna elements 1021 are arranged in a row along an edge of the X-directional side of the antenna substrate 1003. The antenna elements 1021 are arranged at regular intervals. Here, the distance between each two adjacent antenna elements 1021 is the distance corresponding to half the wavelength of radio waves emitted from the antenna elements 1021, for example.

The antenna substrate 1003 can emit, by synthesizing radio waves from the plurality of antenna elements 1021, a radio wave (also referred to as a beam below) with directivity. Concretely, the antenna substrate 1003 adjusts the phases of radio waves emitted from the respective antenna elements 1021 to change the angle (direction) of a beam.

As an example, the antenna substrate 1003 transmits a beam with directivity in the X-direction (B1 in FIG. 1). Concretely, all the antenna elements 1021 emit radio waves of the same frequency in the same phase. As another example, the antenna substrate 1003 transmits a beam inclined in the −Z-direction from the X-direction (B2 in FIG. 1). Concretely, among the antenna elements 1021, one located closer to the direction opposite to the Z-direction (referred to as the −Z-direction below) from the one located closer to the Z-directional side gives a larger phase difference (e.g., a phase difference corresponding to 0.1 times wavelength) to an input signal.

(1) Technical Issues

Figure 2:
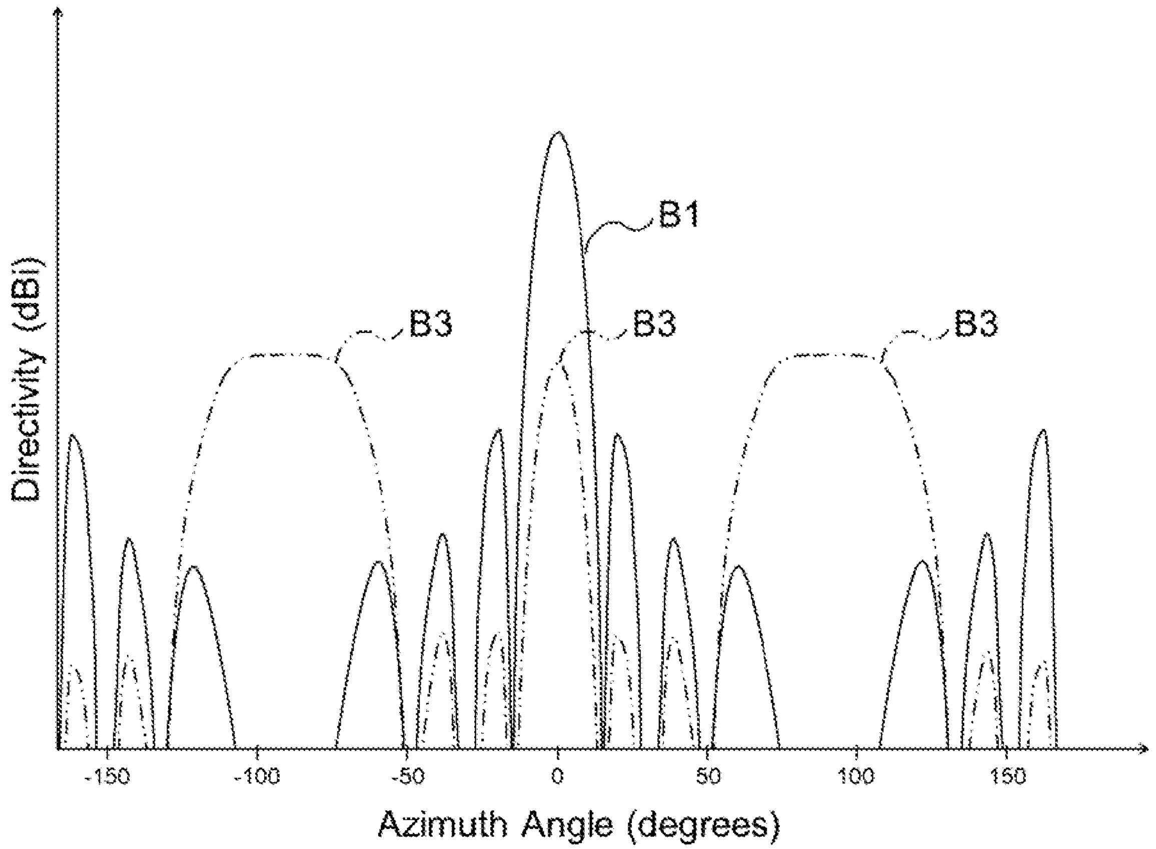
FIG. 2 is a graph of beams in which the vertical axis represents beam intensity while the horizontal axis represents azimuth angle with 0 degree in the X-direction.

FIG. 2 is a graph of beams in which the vertical axis represents beam intensity (directivity (dBi)) while the horizontal axis represents azimuth angle (degrees) with 0 degree being the X-direction. According to this graph, it is understood that the beam with the directivity in X-direction (B1 in FIG. 1 and FIG. 2) is a beam having the highest intensity at an azimuth angle of 0 degree, i.e., in the X-direction. In other words, the beam B1 has high directivity and high antenna gain.

Here, consider a case where the wavelength of a radio wave and the distance between the antenna elements 1021 are the same length, for example. Specifically, even in a case where all the antenna elements 1021 emit radio waves of the same frequency in the same phase, when the distance between the antenna elements 1021 is the same as the wavelength of the radio waves, a plurality (e.g., three) of beams with low intensity are formed (B3 in FIG. 1 and FIG. 2). Such a phenomenon is referred to as grating lobe. In other words, the beams B3 have low directivity and low antenna gain.

Meanwhile, in a case of a waveband exceeding 100 GHz, such as a millimeter waveband or a terahertz waveband (referred to as a high-frequency band below), radio waves have short wavelength. Therefore, to suppress grating lobe in a high-frequency band, the distance between antenna elements need be short. Moreover, an antenna dealing with a high-frequency band has an issue of causing connection loss between a high-frequency circuit and antenna elements and fluctuations in radio wave intensity. Such an issue is considered to reduce quality of radio waves, for example, by causing grating lobe. Note that the frequency-wave circuit is exemplified by elements such as an amplifier, a phase-shifter, a frequency converter, a variable attenuator, and a low-noise amplifier, but is not limited to these.

Hence, such an antenna dealing with a high-frequency band is preferably configured as a so-called on-chip antenna in which a transmission/reception circuit and antenna elements are formed in a semiconductor circuit. With this, the on-chip antenna can reduce the distance between the antenna elements and suppress connection loss between the high-frequency circuit and the antenna elements and fluctuations in radio wave intensity. However, even in a case of using an on-chip antenna, it is considered that the distance between antenna elements is smaller than the width of a high-frequency circuit depending on the wavelength of radio waves, in some cases.

Figure 3:
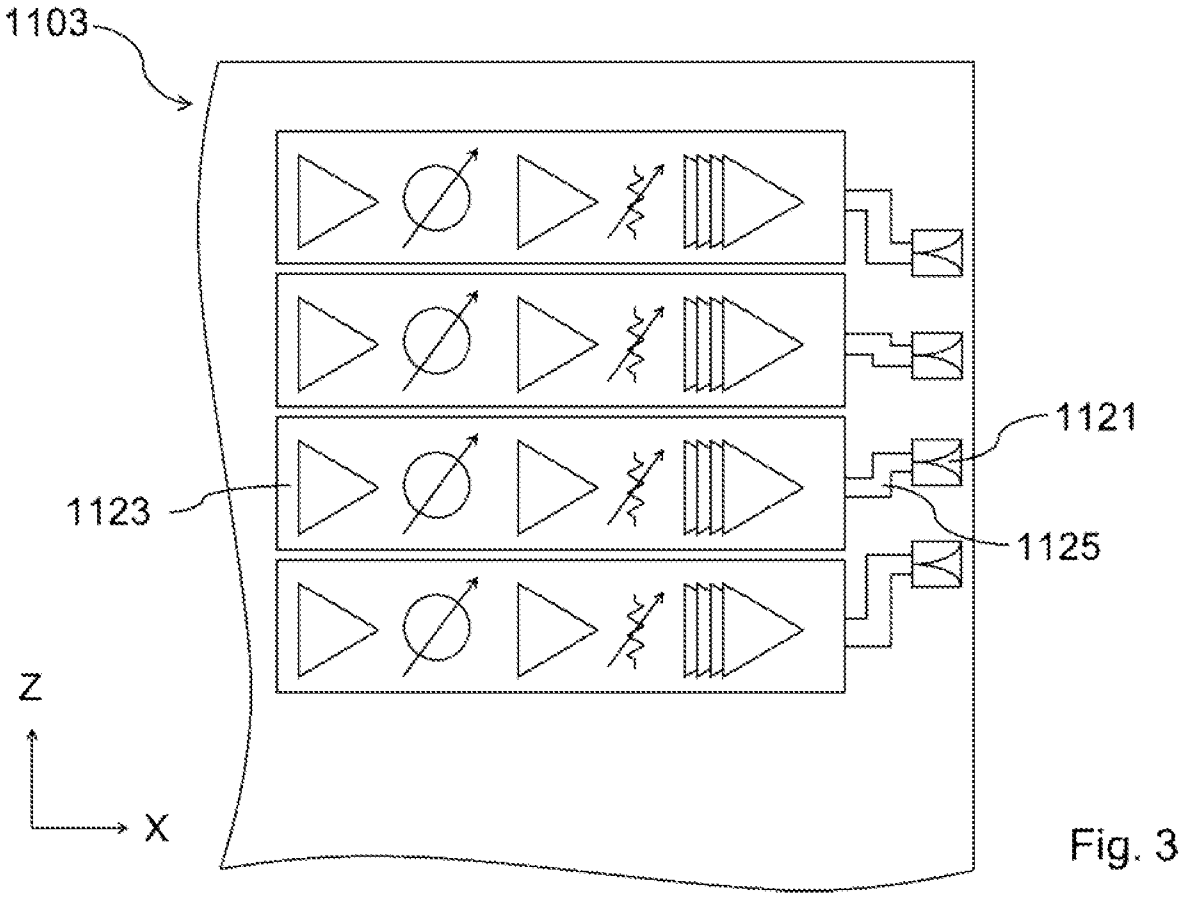
FIG. 3 is a diagram illustrating an example of a circuit of an on-chip antenna in a case where the distance between antenna elements is smaller than the width of a high-frequency circuit.

FIG. 3 is a diagram illustrating an example of a circuit of an on-chip antenna 1103 in a case where the distance between antenna elements is smaller than the width of a high-frequency circuit. In other words, the on-chip antenna 1103 preferably includes a feeder 1125 formed to extend from each high-frequency circuit 1123 toward a corresponding one of the antenna elements 1121. With this, the on-chip antenna 1103 can increase the degree of freedom in arrangement of the antenna elements 1121 and the high-frequency circuits 1123.

Meanwhile, the feeder 1125 extending from the high-frequency circuit 1123 to the antenna element 1121 has a relatively long shape. When the distances between the high-frequency circuits 1123 and the respective antenna elements 1121 are different from each other, the feeders 1125 have different lengths. Such feeders 1125 causes an increase in passing loss and amplitude differences between the antenna elements. Hence, the feeders 1125 having different lengths may reduce antenna gain.

(2) Technical Features

In the one or more example embodiments, an array antenna substrate is provided. The array antenna substrate includes a base body, a plurality of first antenna elements, and a plurality of second antenna elements. The base body extends parallel to a Z-X plane. The plurality of first antenna elements is arranged on an edge of the X-directional side of one surface of the base body and is configured to emit a radio wave at least in the X-direction. The plurality of second antenna elements is arranged on an edge of the X-directional side of the other surface of the base body and is configured to emit a radio wave at least in the X-direction. The plurality of first antenna elements and the plurality of second antenna elements are arranged in the Z-direction. The first antenna elements and the second antenna elements are located alternately viewed in the Z-direction.

According to the configuration, the array antenna substrate can increase practicality of the array antenna substrate itself and practicality of an array antenna apparatus. Concretely, by the first antenna elements and the second antenna elements being located alternately viewed in the Z-direction, the positions of the first antenna elements and the second antenna elements can be shifted relatively in the Z-direction. With this configuration, the array antenna substrate can form beams using the first antenna elements and the second antenna elements. Hence, even when the distance between the first antenna elements is larger than a desired distance due to the size of the high-frequency circuit, for example, it is possible for the array antenna substrate to make the feeders have an equal length while making the distance between each of the first antenna elements and a corresponding one of the second antenna elements be a desired distance.

The antenna apparatus in which the plurality of array antenna substrates is arranged in the Y-direction synthesizes radio waves of adjacent ones of the array antenna substrates to thereby allow adjustment of the directions of beams also for the Y-direction.

2. First Example Embodiment

Next, a description will be given of a first example embodiment and example alterations of the first example embodiment with reference to FIGS. 4 to 11. In the following, for convenience of description, an orthogonal coordinate system X-Y-Z is used for description.

2-1. Configuration of Antenna Apparatus

Figure 4:
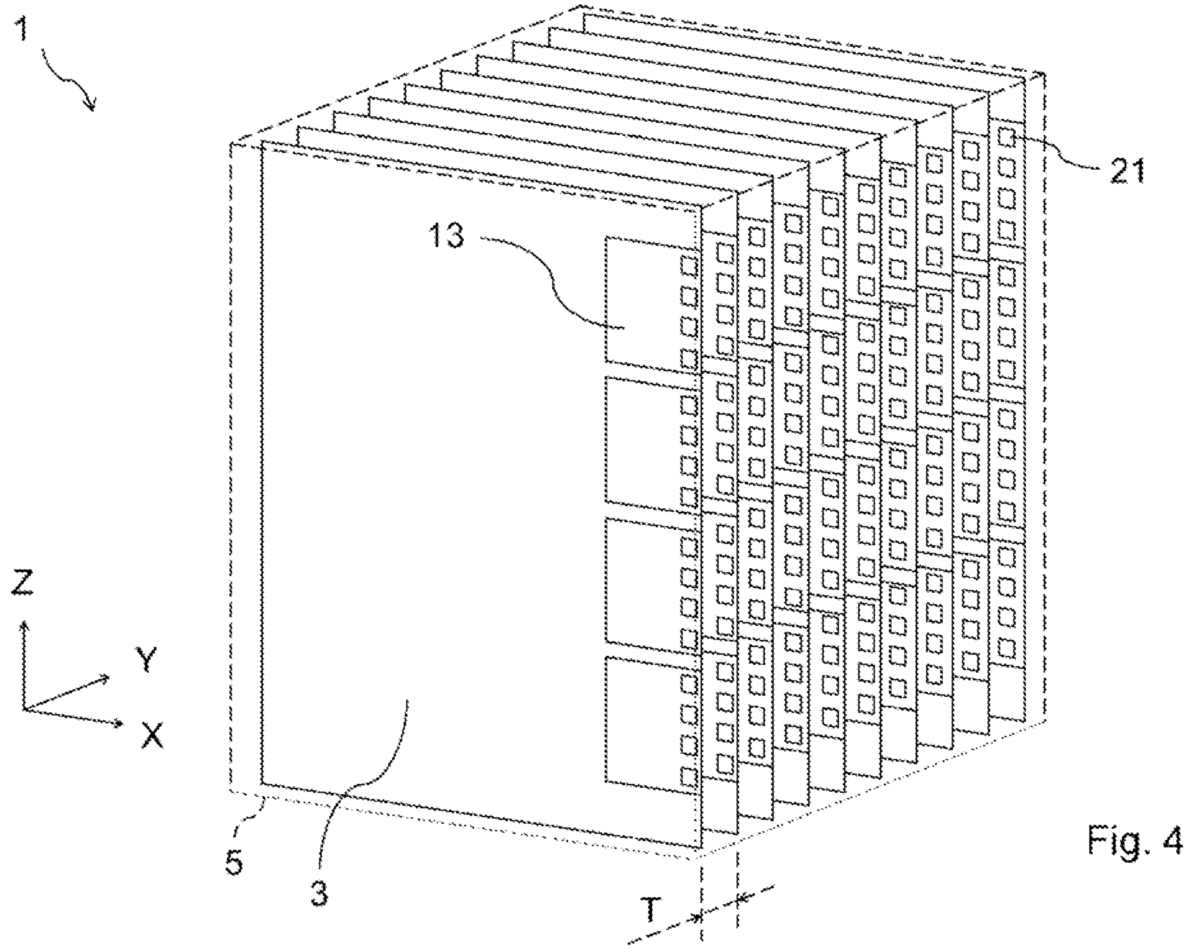
FIG. 4 is a diagram illustrating an example of a configuration of an antenna apparatus.

FIG. 4 is a diagram illustrating an example of a configuration of an antenna apparatus 1. The antenna apparatus 1 is, for example, an array antenna apparatus capable of emitting radio waves in the X-direction and any direction. This antenna apparatus 1 includes a plurality of antenna substrates 3 and a casing 5. The plurality of antenna substrates 3 is provided in the casing 5. The antenna substrates 3 are each a linear array antenna including a plurality of antenna elements 21 to be described later. The antenna elements 21 direct to the X-direction from the casing 5. With this, the antenna apparatus 1 can emit radio waves from the plurality of antenna elements 21 in the X-direction. In the following, for convenience of description, the antenna apparatus 1 and the antenna substrates 3 are configured to emit radio waves from the antenna elements 21 in the X-direction. However, the antenna apparatus 1 and the antenna substrates 3 may be configured to receive radio waves or may be configured to be capable of both transmission and reception.

2-2. Configuration of Antenna Substrates

Figure 5:
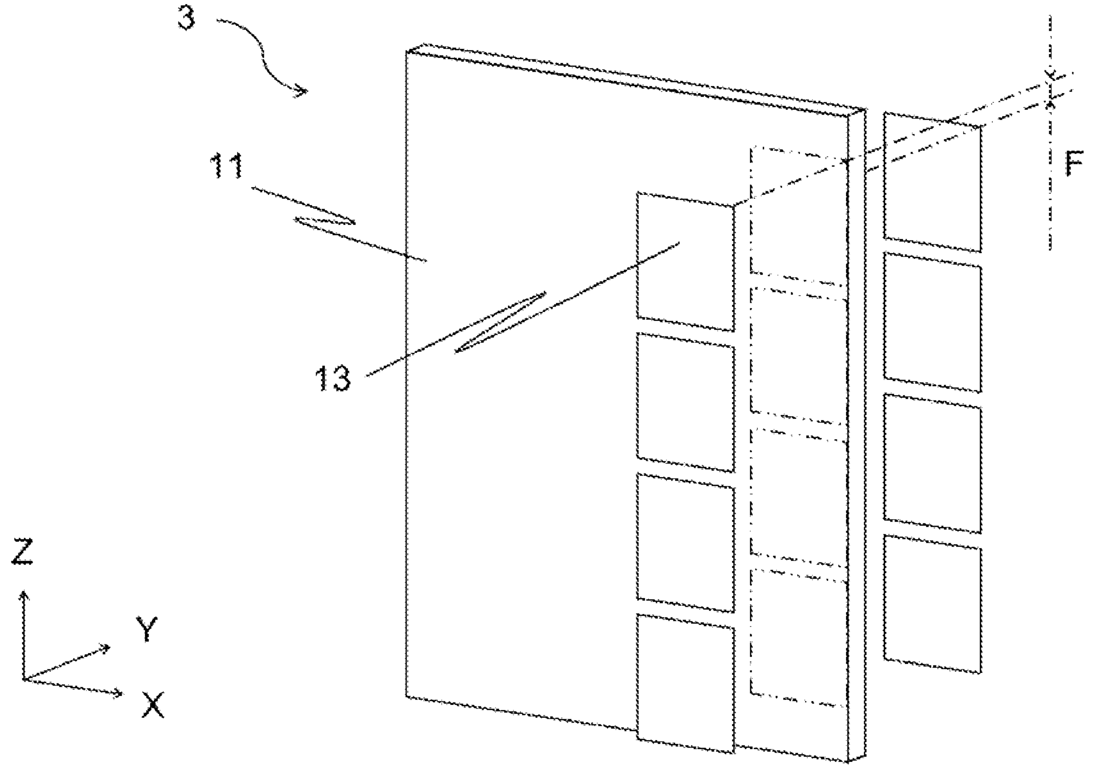
FIG. 5 is a diagram illustrating an example of a configuration of an antenna substrate.

FIG. 5 is a diagram illustrating an example of a configuration of each of the antenna substrates 3. The antenna substrate 3 includes a base body 11 and a plurality of semiconductor integrated circuit bodies 13. The base body 11 is a plate-shaped member mainly containing an insulating material, for example. The plurality of semiconductor integrated circuit bodies 13 is attached to both surfaces of the base body 11.

Figure 6:
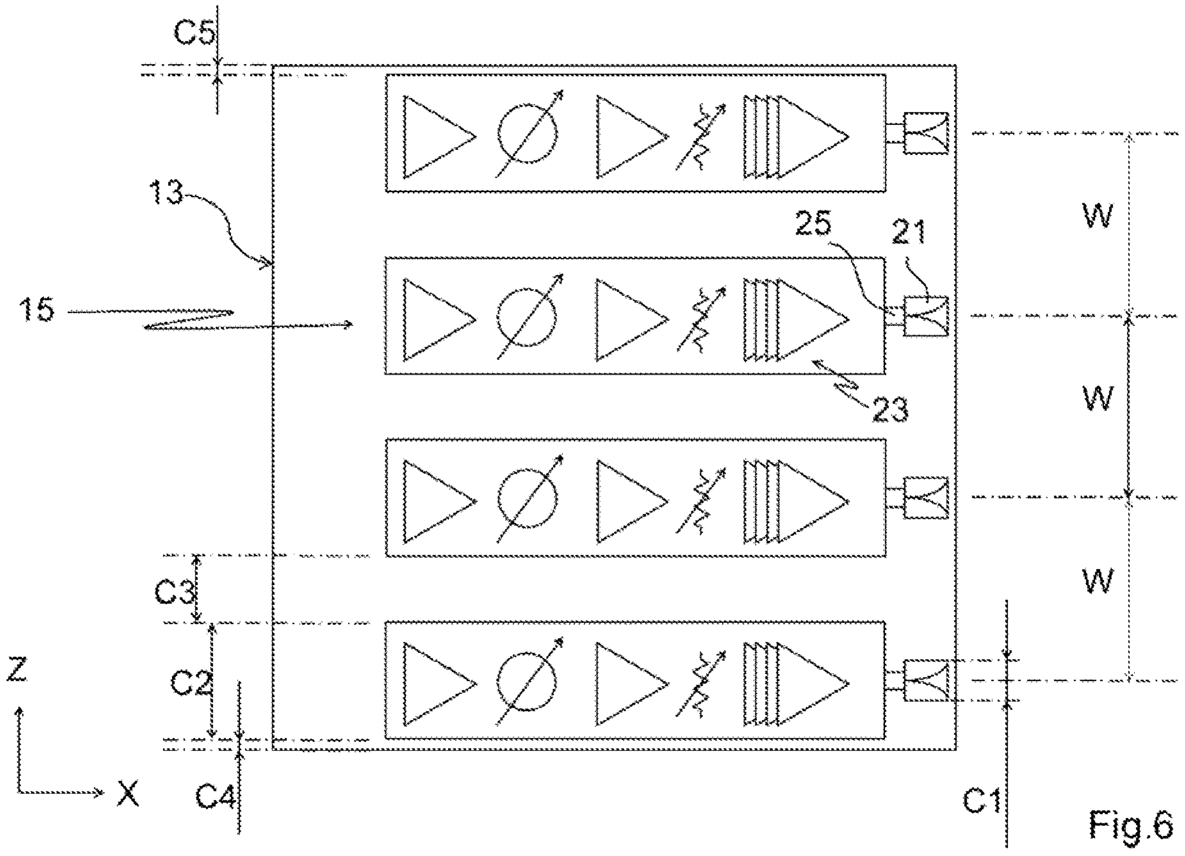
FIG. 6 is a diagram illustrating an example of a configuration of a semiconductor integrated circuit body.

FIG. 6 is a diagram illustrating an example of a configuration of each of the semiconductor integrated circuit bodies 13. The semiconductor integrated circuit body 13 is a planar (thin-film like) semiconductor integrated circuit including a plurality (e.g., four) integrated circuit sections 15. The integrated circuit sections 15 each include the antenna element 21, the high-frequency circuit element 23, and the feeder 25. The frequency band used by the high-frequency circuit element 23 is a high frequency band of 100 GHz or higher. The antenna element 21 is, for example, a Vivaldi antenna configured to convert a power supplied from the high-frequency circuit element 23 via the feeder 25 into a radio wave and emit the radio wave. The plurality of antenna elements 21 is each formed on an edge of the X-directional side of the corresponding integrated circuit section 15 to be arranged at regular intervals in the Z-direction. In the following, the Z-directional length of the antenna elements 21 is expressed as a length C1. Note that, for the antenna elements 21, dipole antennas may be used instead of Vivaldi antennas, and an optimal kind of antenna elements may be used appropriately.

The high-frequency circuit element 23 is a circuit including a plurality of elements. The plurality of elements includes an amplifier, a phase-shifter, a frequency converter, a variable attenuator, a low-noise amplifier, and the like. This high-frequency circuit element 23 is electrically connected to the antenna element 21 one by one via the feeder 25. With this, the high-frequency circuit element 23 can adjust voltage, current, frequency, and the like and supply a power to the antenna element 21 electrically connected to the high-frequency circuit element 23. When the high-frequency circuit element 23 includes the plurality of elements as those described above, the elements are arranged in the X-direction. In addition, the Z-directional length of the high-frequency circuit element 23 is expressed as a length C2.

Here, the plurality (e.g., four) of integrated circuit sections 15 are arranged on an edge of the X-directional side of the semiconductor integrated circuit body 13 at regular intervals in the Z-direction. In each of the plurality of integrated circuit sections 15, the corresponding antenna element 21 is located on the edge of the X-directional side of the semiconductor integrated circuit body 13. In other words, in the semiconductor integrated circuit body 13, the plurality (e.g., four) of antenna elements 21 are arranged on the edge of the X-directional side of the semiconductor integrated circuit body 13 at regular intervals (e.g., with a width W) in the Z-direction. The high-frequency circuit element 23 extends in a direction (referred to as the −X-direction below) opposite to the X-direction where the antenna element 21 is located.

With this, it is possible for the semiconductor integrated circuit body 13 to allow the Z-directional width to be small while arranging the plurality (e.g., four) of antenna elements 21 at regular intervals (e.g., with the width W) in the Z-direction.

Figure 7:
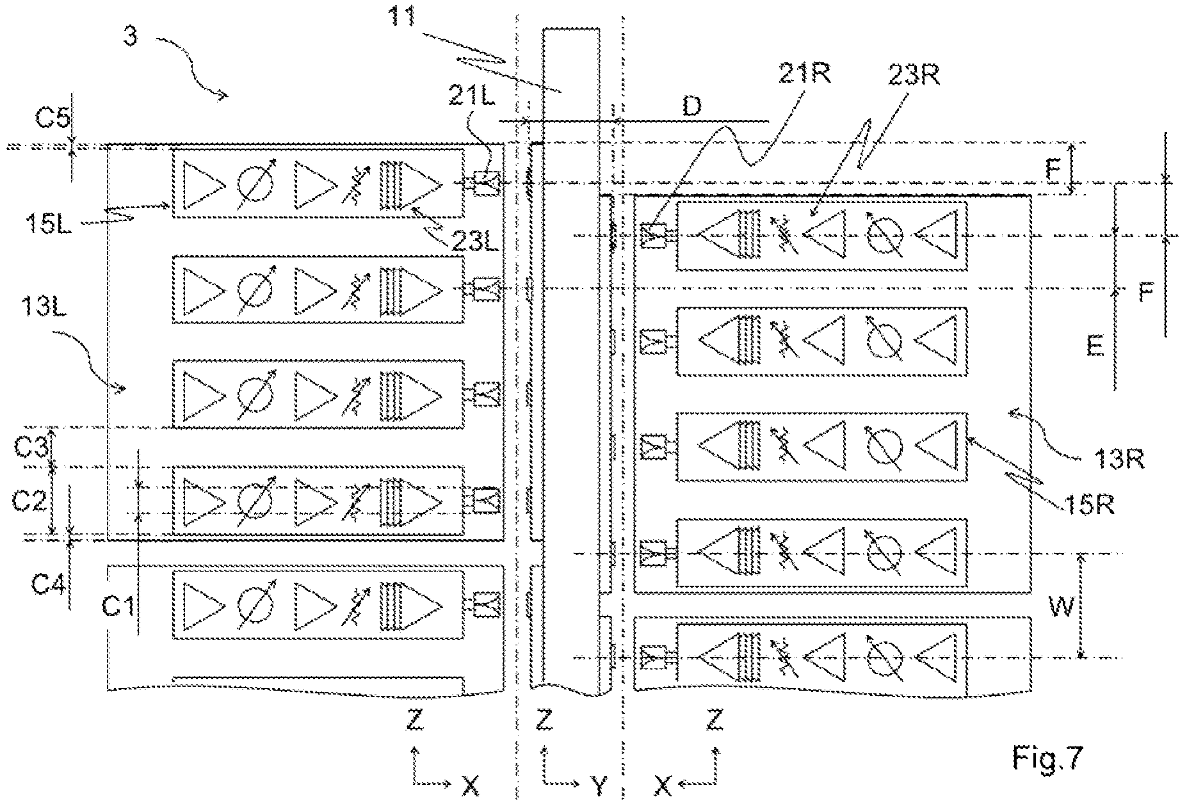
FIG. 7 is an explanatory diagram obtained by horizontally arranging, in a row in a single figure, a Y-Z plane view of an antenna substrate viewed from an X-directional side, a left Z-X plane view of the antenna substrate viewed from the left with respect to the Y-Z plane view, and a right Z-X plane view of the antenna substrate viewed from the right with respect to the Y-Z plane view.

FIG. 7 is an explanatory diagram obtained by horizontally arranging, in a row in a single figure, a Y-Z plane view of the antenna substrate 3 viewed from an X-directional side, a left Z-X plane view of the antenna substrate 3 viewed from the left with respect to the Y-Z plane view (−Y-direction), and a right Z-X plane view of the antenna substrate 3 viewed from the right with respect to the Y-Z plane view (Y-direction). The Y-Z plane view, the left Z-X plane view, and the right Z-X plane view have the same Z-directional coordinate. In the following, for convenience of description, part of the semiconductor integrated circuit body 13, the part being illustrated in the left Z-X plane view, is expressed as a semiconductor integrated circuit body 13L, and part of the semiconductor integrated circuit body 13, the part being illustrated in the right Z-X plane view, is expressed as a semiconductor integrated circuit body 13R. Similarly, for each component of the semiconductor integrated circuit body 13, L or R is attached to the end of the reference sign.

The semiconductor integrated circuit body 13L has a shape line-symmetric to the semiconductor integrated circuit body 13R with respect to the base body 11. Antenna elements 21L and antenna elements 21R are separated from each other at a distance D in the Y-direction. In other words, the antenna elements 21L and the antenna elements 21R are separated from each other at the distance D with the antenna elements 21L being arranged in a row in the Z-direction and the antenna elements 21R being arranged in a row in the Z-direction.

Furthermore, the semiconductor integrated circuit body 13L is provided to the base body 11 at a position offset from the semiconductor integrated circuit body 13R with a distance F in the Z-direction. With this, the antenna elements 21L are each located at a position offset from the corresponding antenna element 21R with the distance F in the Z-direction. Consequently, the distance between each of the antenna elements 21R and the antenna element 21L located in the positive direction from the antenna element 21R viewed in the Z-direction among the antenna elements 21L adjacent to the antenna element 21R in the Z-direction is also the distance F. In the following, for convenience of description, the distance between the antenna element 21L located in the negative direction from the antenna element 21R viewed in the Z-direction and the antenna element 21R is expressed as a distance E.

2-3. Effects

As described above, the distance between the antenna element 21L and the antenna element 21R in the Z-direction is the distance F, and thus the antenna substrate 3 can provide a phase shift between a radio wave emitted from the antenna element 21L and a radio wave emitted from the antenna element 21R.

Here, the distance F is preferably, for example, approximately half a wavelength L of radio waves emitted from the antenna element 21L and the antenna element 21R, and concretely equal to or larger than 0.4 times the wavelength L and equal to or smaller than 0.8 times the wavelength L. More preferably, the distance F is equal to or larger than 0.5 times the wavelength L and equal to or smaller than 0.6 times the wavelength L. In this way, by arranging the antenna element 21L and the antenna element 21R to have the distance F obtained by considering the wavelength L, the antenna substrate 3 can provide a phase shift between radio waves to adjust characteristics of a waveform of a synthetic wave and the like. In particular, when the distance F is approximately half the wavelength L of radio waves as described as an example, the antenna elements 21L and 21R adjacent to each other viewed in the Z-direction can, while suppressing grating lobe, increase antenna gain.

The distance F is preferably the same value as that of the distance E. Specifically, the distance F is preferably approximately half the width W, and is more preferably equal to or larger than one-thirds of the width W and equal to or smaller than two-thirds of the width W. With this, the plurality of antenna elements 21L and 21R is arranged alternately at regular intervals viewed in the Z-direction. Hence, the antenna substrate 3 can, while accurately suppressing grating lobe, increase antenna gain. The width W, which is the width between each two antenna elements 21R, is preferably a distance substantially the same as the wavelength L, for example. With this, the distance F and the distance E are equal to half the wavelength L. Accordingly, the antenna substrate 3 can, while more accurately suppressing grating lobe, increase antenna gain.

Furthermore, the distance W is preferably equal to or larger than 0.8 times the wavelength L and equal to or smaller than 1.6 times the wavelength L. More preferably, the distance W is equal to or larger than the wavelength L and equal to or smaller than 1.2 times the wavelength L. With this, the distance F and the distance E may be equal to or larger than 0.27 times the wavelength L and equal to or smaller than 1.07 times the wavelength L, and more preferably, equal to or larger than 0.33 times the wavelength L and equal to or smaller than 0.8 times the wavelength L. Accordingly, the antenna substrate 3 can provide a phase shift between radio waves in an appropriate range.

The distance D, which is the distance between the antenna elements 21L and 21R, is equal to or smaller than the wavelength L, for example. With this, the antenna elements 21L and 21R adjacent to each other viewed in the Z-direction can adjust the characteristics of the waveform of a synthetic wave in the Y-direction and the like, by the distance D obtained by considering the wavelength L, and can hence, while suppressing grating lobe, increase antenna gain.

As described above, in the present example embodiment, the Z-directional length of each antenna element 21L is expressed as a length C1, and the Z-directional length of each high-frequency circuit element 23L is expressed as a length C2. In addition, in the present example embodiment, the distance between high-frequency circuit elements 23L adjacent to each other in the Z-direction in the semiconductor integrated circuit body 13L is expressed as a distance C3, the distance from an edge in the negative-directional side of the semiconductor integrated circuit body 13L to the high-frequency circuit elements 23L on the most negative-directional side in the semiconductor integrated circuit body 13L viewed in the Z-direction is expressed as a distance C4, and the distance from an edge in the positive-directional side of the semiconductor integrated circuit body 13L to the high-frequency circuit elements 23L on the most positive-directional side in the semiconductor integrated circuit body 13L viewed in the Z-direction is expressed as a distance C5.

The length C2 is preferably equal to or larger than the length C1. With this, the high-frequency circuit element 23 can include elements each being larger in the Z-direction than the antenna element 21. Meanwhile, the length C2 is preferably equal to or smaller than the average value of the widths W. With this, the semiconductor integrated circuit body 13 can include the integrated circuit sections 15 having a small Z-directional width. Hence, the high-frequency circuit element 23 having the length C2 equal to or smaller than the width W can have the average value of the distance F and the distance E being equal to or smaller than half the width W without interfering with adjacent high-frequency circuit elements 23.

Preferably, the length C2 is equal to or larger than 0.8 times the wavelength L and equal to or smaller than 1.6 times the wavelength L. More preferably, the length C2 is equal to or larger than the wavelength L and equal to or smaller than 1.2 times the wavelength L. With this, the distance W results in being equal to or larger than 0.8 times the wavelength L and equal to or smaller than 1.6 times the wavelength L, and preferably, equal to or larger than the wavelength L and equal to or smaller than 1.2 times the wavelength L. Hence, the semiconductor integrated circuit body 13 can have the average value of the distance F and the distance E being equal to or larger than 0.27 times the wavelength L and equal to or smaller than 1.07 times the wavelength L, and preferably, equal to or larger than 0.33 times the wavelength L and equal to or smaller than 0.8 times the wavelength L.

Moreover, the distance C3 is preferably equal to or smaller than the length C2. With this, the semiconductor integrated circuit body 13 can have a small Z-directional width. In view of the above, the semiconductor integrated circuit body 13 preferably has the length C2 being equal to or larger than the length C1 and equal to or smaller than the wavelength L and the distance C3 being equal to or smaller than the length C2. With this configuration, the semiconductor integrated circuit body 13 can, while securing the performance of the high-frequency circuit elements 23, have the Z-directional distance between the antenna elements 21 being equal to or smaller than twice the wavelength L. Hence, the antenna substrate 3 can have a shorter one of or both the distance E and the distance F, which are the distances between the antenna elements 21L and the antenna elements 21R, being equal to or smaller than the wavelength L.

Furthermore, the distance C4 and the distance C5 are preferably equal to or smaller than the smaller one of the distance E and the distance F. With this, even when a plurality of semiconductor integrated circuit bodies 13L is arranged in the Z-direction, for example, the antenna substrate 3 can have the distance between the antenna elements 21L of each adjacent semiconductor integrated circuit bodies 13L being equal to the distance of the smaller one of the distance E and the distance F.

Moreover, the antenna apparatus 1 in which the plurality of antenna substrates 3 is arranged in the Y-direction can synthesize radio waves of adjacent ones of the adjacent antenna substrates 3 to thereby adjust the directions of beams also in the Y-direction.

Return to FIG. 4. In the antenna apparatus 1, the plurality of antenna substrates 3 is arranged at regular intervals in the Y-direction. In detail, the regular intervals each indicate a Z-directional distance T between the antenna element 21R on the Y-side of the antenna substrate 3 and the corresponding antenna element 21L on the −Y-side of the adjacent antenna substrate 3 that is adjacent to the antenna substrate 3 on the Y-side. The distance T is preferably the same as the distance E or the distance F and may be a distance in a range from the distance E to the distance F.

With this, the antenna apparatus 1 can also synthesize radio waves between the antenna element 21R on the Y-side of the antenna substrate 3 and the corresponding antenna element 21L on the −Y-side of the adjacent antenna substrate 3 that is adjacent to the antenna substrate 3 on the Y-side. Hence, the antenna apparatus 1 can also increase directivity of beams in the Y-direction. In particular, as described above, the distance T is equal to either of the distances E and F or a distance in the range from the distance E to the distance F. Hence, the antenna apparatus 1 can have directivity of beams in the Y-direction being equivalent to that in the Z-direction.

2-4. Example Alterations

A technique according to the present disclosure is not limited to the above-described example embodiment.

(1) First Example Alteration

Figure 8:
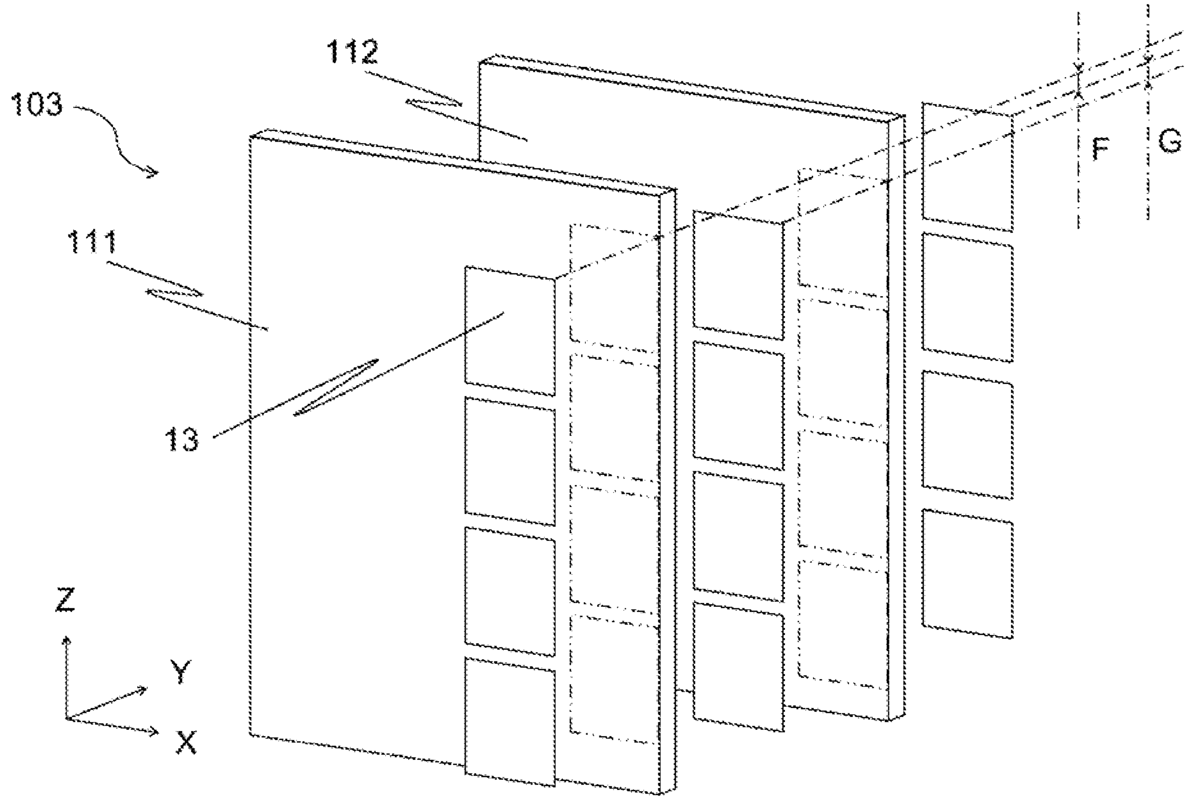
FIG. 8 is a diagram illustrating an example of a configuration of an antenna substrate according to a first example alteration.

FIG. 8 is a diagram illustrating an example of a configuration of an antenna substrate 103 according to a first example alteration. The antenna substrate 103 includes a first base body 111, a second base body 112, and a plurality of semiconductor integrated circuit bodies 13. The first base body 111 according to the first example alteration and the second base body 112 according to the first example alteration are each a plate-shaped member mainly containing an insulating material similarly to the base body 11.

The plurality of semiconductor integrated circuit bodies 13 is arranged, so as to sandwich the first base body 111 extending along a Z-X plane, on both surfaces of the first base body 111. The plurality of semiconductor integrated circuit bodies 13 of the Y-directional side of the first base body 111 is sandwiched between the first base body 111 and the second base body 112. Furthermore, the plurality of semiconductor integrated circuit bodies 13 is arranged on a surface of the Y-directional side of the second base body 112. In the following, for convenience of description, the semiconductor integrated circuit bodies 13 arranged on the −Y-directional side surface of the first base body 111 are expressed as 13L, the semiconductor integrated circuit bodies 13 located while being sandwiched between the first base body 111 and the second base body 112 are expressed as 13C, and the semiconductor integrated circuit bodies 13 arranged on the Y-directional side surface of the second base body 112 are expressed as 13R.

Figure 9:
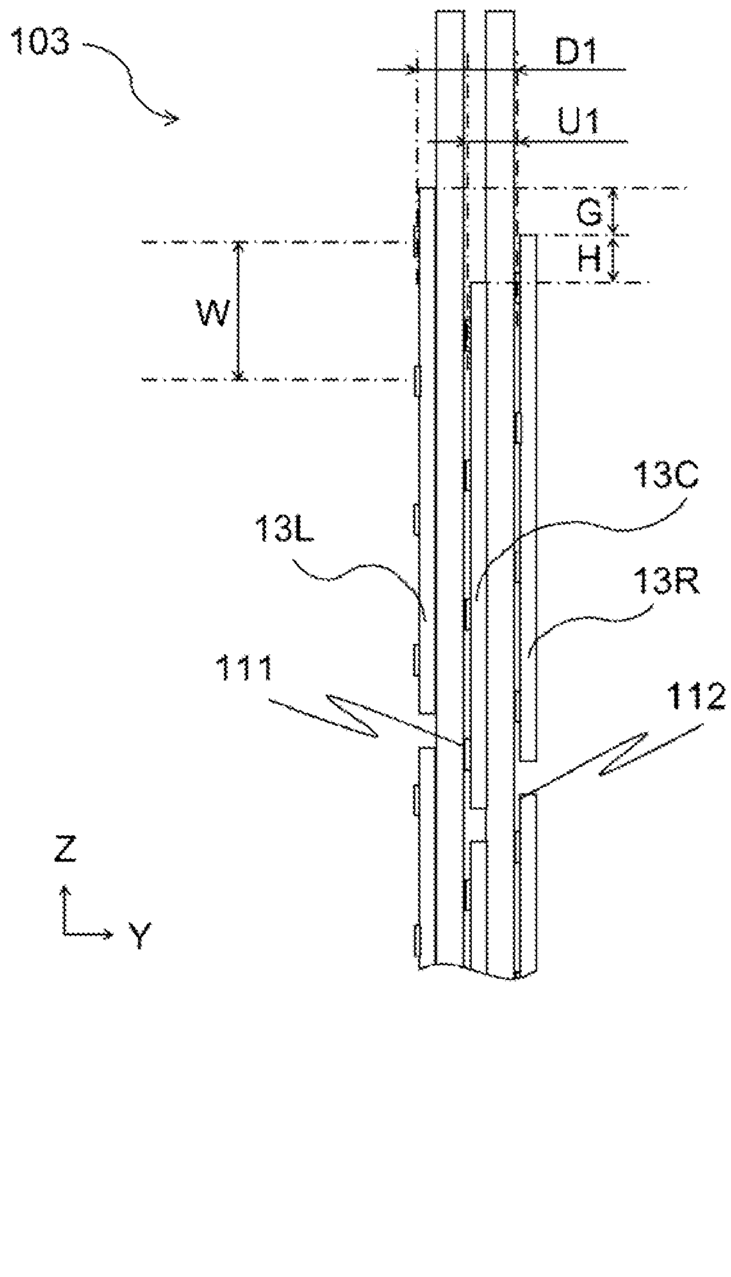
FIG. 9 is a Y-Z plane view of the antenna substrate according to the first example alteration viewed from the X-directional side.

FIG. 9 is a Y-Z plane view of the antenna substrate 103 according to the first example alteration viewed from the X-directional side. The semiconductor integrated circuit bodies 13 are each an integrated circuit body similar to the semiconductor integrated circuit body 13 of the above-described example embodiment, and each include the antenna elements 21 located on an edge of the X-directional side of the semiconductor integrated circuit body 13, in other words, located on the X-directional side of the antenna substrate 103. Specifically, the semiconductor integrated circuit body 13L is arranged at a position offset from the semiconductor integrated circuit body 13R with a distance G in the Z-direction. The semiconductor integrated circuit body 13C is arranged at a position offset from the semiconductor integrated circuit body 13R with a distance H in the −Z-direction. As an example, a width W according to the first example alteration (the distance between the antenna elements 21 in the semiconductor integrated circuit body 13) is preferably 3/2 times the wavelength L. As an example, the distance G and the distance H are both preferably equivalent to the distance E and the distance F of the example embodiment described above.

With this, the antenna substrate 103 according to the first example alteration can arrange the semiconductor integrated circuit bodies 13L, 13C, and 13R offset from each other with half the wavelength L in the Z-direction and thereby arrange the antenna elements 21L, 21C, and 21R offset from each other with half the wavelength L in the Z-direction. The antenna substrate 103 according to the first example alteration can, while having the distance between the antenna elements 21L, 21C, and 21R being equal to a desired distance, such as half the wavelength L, have the distance W between the antenna elements 21 in the semiconductor integrated circuit bodies 13 being relatively large. Note that the order of the semiconductor integrated circuit bodies 13R, 13L, and 13C may be changed appropriately.

In the first example alteration, within the distance W, three layers of the semiconductor integrated circuit bodies 13L, 13C, and 13R are formed in the Y-direction. However, Equation 1 below is satisfied where the number of layers is the number N of layers and the average value of the distances between the antenna elements 21L, 21C, and 21R adjacent to each other in the Z-direction is a distance Q.

$$\text{Distance } W = \text{number } N \text{ of layers} \times \text{Distance } Q \qquad \text{(Equation 1)}$$

Hence, according to Equation 1 above, by increasing the number N of layers of the semiconductor integrated circuit bodies 13 according to the size of the high-frequency circuit elements 23, the antenna substrate 103 can, while increasing the distance W, maintain the average distance Q between the antenna elements 21.

The distance G is preferably the same value as the distance H. Specifically, the distance G is preferably approximately one-thirds of the width W, and is more preferably equal to or larger than one-fourth of the width W and equal to or smaller than half the width W. With this, the plurality of antenna elements 121L, 121C, and 121R is arranged alternately at regular intervals viewed in the Z-direction. Hence, the antenna substrate 103 can, while accurately suppressing grating lobe, increase antenna gain. The width W, which is the width between the antenna elements 121R, is preferably a distance substantially the same as 3/2 times the wavelength L, for example. With this, the distance G and the distance H are equal to half the wavelength L. Accordingly, the antenna substrate 3 can, while more accurately suppressing grating lobe, increase antenna gain.

(2) Second Example Alteration

Figure 10:
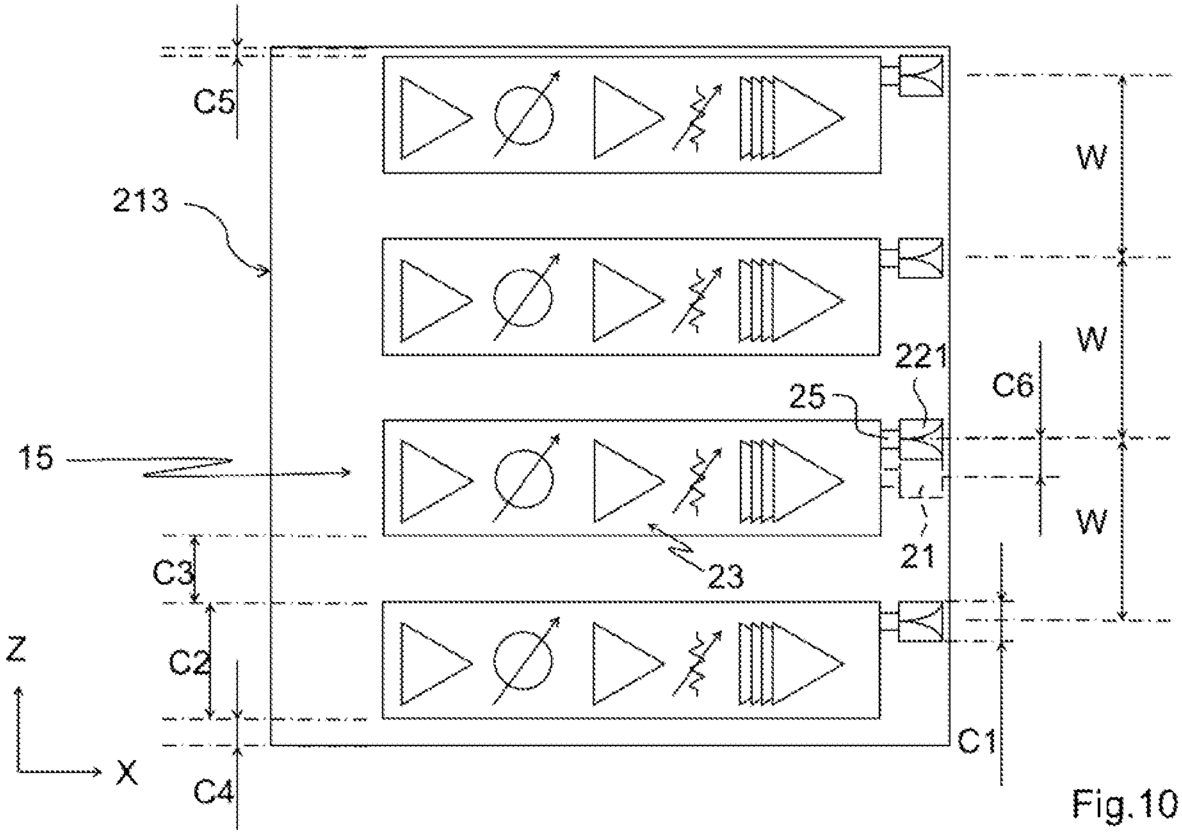
FIG. 10 is a diagram illustrating an example of a configuration of a semiconductor integrated circuit body according to a second example alteration.

FIG. 10 is a diagram illustrating an example of a configuration of a semiconductor integrated circuit body 213 according to a second example alteration. Antenna elements 221 according to the second example alteration are each located offset from the corresponding antenna element 21 with a distance C6 in the Z-direction. Note that the feeders 25 may each be located with offset with the distance C6 in the Z-direction similarly to the antenna element 221 or may have a shape extending in the Z-direction to correspond to the offset of the antenna element 221. In this case, all the feeders 25 may have the same length. According to this configuration, the feeders 25 can suppress fluctuations in radio wave intensity. Moreover, the lengths of the feeders 25 are preferably as short as possible.

The distance C5 of the semiconductor integrated circuit body 213 described above is smaller than the distance C4. Note that, in the second example alteration, a description will be given by assuming that the distance C5 is a smaller value than that of the distance C4. However, the distance C5 may be equal to or larger than the distance C4 according to the configuration of the entire antenna substrate 203.

Figure 11:
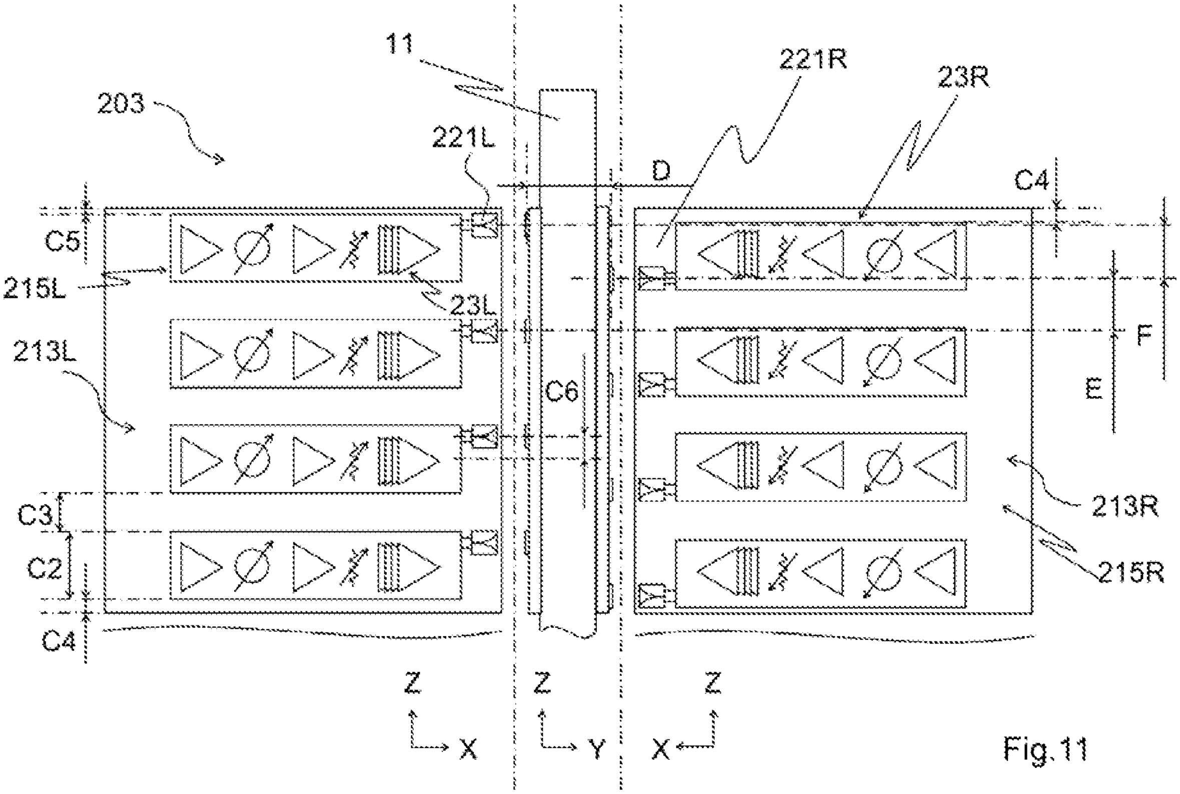
FIG. 11 is an explanatory diagram obtained by horizontally arranging, in a row in a single figure, a Y-Z plane view of an antenna substrate according to the second example alteration viewed from an X-directional side, a left Z-X plane view of the antenna substrate viewed from the left with respect to the Y-Z plane view, and a right Z-X plane view of the antenna substrate viewed from the right with respect to the Y-Z plane view.

FIG. 11 is an explanatory diagram obtained by horizontally arranging, in a row in a single figure, a Y-Z plane view of the antenna substrate 203 according to the second example alteration viewed from an X-directional side, a left Z-X plane view of the antenna substrate 203 viewed from the left with respect to the Y-Z plane view (−Y-direction), and a right Z-X plane view of the antenna substrate 203 viewed from the right with respect to the Y-Z plane view (Y-direction). In the antenna substrate 203 according to the second example alteration, semiconductor integrated circuit bodies 213L and 213R are identical semiconductor integrated circuit bodies 213. Specifically, the semiconductor integrated circuit body 213R is an electric circuit having the same shape as that of the semiconductor integrated circuit body 213L and is provided in a position obtained by rotating the semiconductor integrated circuit body 213L 180 degrees about the X-direction.

Here, as described above, the distance C5 is smaller than the distance C4. Hence, when the Z-coordinates of the Z-directional ends of the semiconductor integrated circuit body 213L and the semiconductor integrated circuit body 213R are matched, the integrated circuit section 215L is located at a position offset from the integrated circuit section 215R with the amount obtained by subtracting the distance C5 from the distance C4, in the Z-direction.

As described above, the antenna elements 221 according to the second example alteration are each located by offset from the corresponding antenna element 21 with a distance C6 in the Z-direction. Hence, for example, when the integrated circuit section 215L and the integrated circuit section 215R face each other, the antenna element 221L is located at a position offset from the antenna element 221R with twice the distance C6.

In other words, the integrated circuit section 215L is at a position offset from the integrated circuit section 215R with the amount obtained by subtracting the distance C5 from the distance C4, in the Z-direction. The antenna element 221L is located at a position offset from the antenna element 221R with twice the distance C6. With this, when the Z-coordinates of the Z-directional ends of the semiconductor integrated circuit body 213L and the semiconductor integrated circuit body 213R are matched, Equation 2 below is satisfied for the Z-directional relative distance F of the antenna element 221L from the antenna element 221R.

$$\text{Distance } F = \text{distance } C4 - \text{distance } C5 + \text{distance } C6 \times 2 \quad \text{(Equation 2)}$$

Hence, the antenna substrate 203 can, while matching the Z-coordinates of the Z-directional ends of the semiconductor integrated circuit body 213L and the semiconductor integrated circuit body 213R, obtain the Z-directional relative distance F of the antenna element 221L from the antenna element 221R. With this, the antenna substrate 203 can reduce the Z-directional size of the antenna substrate 203 compared to a case where the Z-directional relative distance F between the antenna elements is obtained by shifting semiconductor integrated circuit bodies relatively in the Z-direction.

The semiconductor integrated circuit body 213 can adjust the distances C4, C5, and C6 to have the distance F being a specific value. With this, the antenna substrate 203 can use the semiconductor integrated circuit bodies 213 according to the second example alteration, which are identical semiconductor integrated circuit bodies, as the semiconductor integrated circuit body 213L and the semiconductor integrated circuit body 213R. Hence, the semiconductor integrated circuit bodies 213 according to the second example alteration can improve mass productivity, design easiness, and the like, compared with a case where the semiconductor integrated circuit bodies 213L and the semiconductor integrated circuit bodies 213R are produced separately.

3. Second Example Embodiment

Next, a description will be given of a second example embodiment with reference to FIG. 12. The above-described first example embodiment is a concrete example embodiment, whereas the second example embodiment is a more generalized example embodiment.

Figure 12:
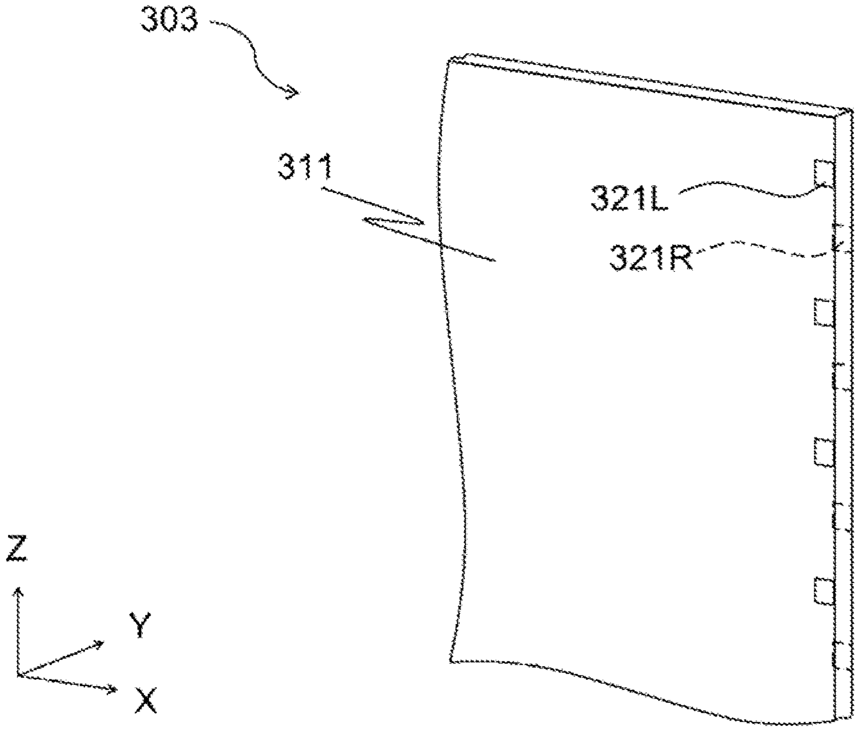
FIG. 12 is a diagram illustrating an example of a configuration of an antenna substrate 303 according to a second example embodiment.

FIG. 12 is a diagram illustrating an example of a configuration of an antenna substrate 303 according to the second example embodiment. The antenna substrate 303 includes a base body 311, a plurality of antenna elements 321L (first antenna elements), and a plurality of antenna elements 321R (second antenna elements).

The base body 311 extends parallel to a Z-X plane in an orthogonal coordinate system X-Y-Z. The plurality of antenna elements 321L is arranged on an edge of the X-directional side of one surface of the base body 311 and is configured to emit a radio wave at least in the X-direction. The plurality of antenna elements 321R is arranged on an edge of the X-directional side of the other surface of the base body 311 and is configured to emit a radio wave at least in the X-direction.

Here, the plurality of antenna elements 321L is arranged in the Z-direction. The plurality of antenna elements 321R is arranged in the Z-direction.

In addition, the antenna elements 321L and the antenna elements 321R are located alternately viewed in the Z-direction.

The whole or part of the example embodiments and the example alterations above can be described as, but not limited to, the following supplementary notes.

(Supplementary Note 1)

An array antenna substrate comprising:

a base body extending parallel to a Z-X plane in an orthogonal coordinate system X-Y-Z;

a plurality of first antenna elements, arranged on an edge of the X-directional side of one surface of the base body, and configured to emit a radio wave at least in the X-direction;

a plurality of second antenna elements, arranged on an edge of the X-directional side of the other surface of the base body, and configured to emit a radio wave at least in the X-direction, wherein the plurality of first antenna elements is arranged in the Z-direction, the plurality of second antenna elements is arranged in the Z-direction, and the first antenna elements and the second antenna elements are located alternately viewed in the Z-direction.

(Supplementary Note 2)

The array antenna substrate according to supplementary note 1, wherein the plurality of first antenna elements and the plurality of second antenna elements are arranged at regular intervals in the Z-direction.

(Supplementary Note 3)

The array antenna substrate according to supplementary note 1 or 2, comprising:

a first high-frequency circuit element extending in the −X-direction from any of the first antenna elements; and a second high-frequency circuit element extending in the −X-direction from any of the second antenna elements.

(Supplementary Note 4)

The array antenna substrate according to supplementary note 3, wherein a Z-directional size of at least one of the first high-frequency circuit element and the second high-frequency circuit element is equal to or smaller than an average value of distances between adjacent ones of the first antenna elements.

(Supplementary Note 5)

The array antenna substrate according to supplementary note 3 or 4, comprising feeders configured to connect the plurality of respective antenna elements and the plurality of respective high-frequency circuit elements, the feeders including a plurality of first feeders configured to connect the plurality of respective first antenna elements and the respective first high-frequency circuit elements and a plurality of second feeders configured to connect the plurality of respective second antenna elements and the respective second high-frequency circuit elements, wherein the length of the first feeders and the length of the second feeders are same.

(Supplementary Note 6)

The array antenna substrate according to any one of supplementary notes 1 to 5, comprising:

a first semiconductor integrated circuit body provided on the one surface of the base body; and a second semiconductor integrated circuit body provided on the other surface of the base body, wherein the first antenna elements are formed in the first semiconductor integrated circuit body, and the second antenna elements are formed in the second semiconductor integrated circuit body.

(Supplementary Note 7)

The array antenna substrate according to supplementary note 6, comprising a high-frequency circuit element extending in the −X-direction from any of the antenna elements, wherein the high-frequency circuit elements are formed in the first semiconductor integrated circuit body and the second semiconductor integrated circuit body.

(Supplementary Note 8)

The array antenna substrate according to supplementary note 6 or 7, wherein the first semiconductor integrated circuit body is an electric circuit having a same shape as that of the second semiconductor integrated circuit body and is provided in an orientation obtained by rotating the second semiconductor integrated circuit body 180 degrees about the X-direction.

(Supplementary Note 9)

An array antenna apparatus comprising a plurality of the array antenna substrates according to any one of supplementary notes 1 to 8.

(Supplementary Note 10)

An array antenna substrate comprising:

a first semiconductor integrated circuit body extending parallel to a Z-X plane in an orthogonal coordinate system X-Y-Z;

a second semiconductor integrated circuit body extending parallel to the Z-X plane;

a plurality of first antenna elements, arranged on an edge of the X-directional side of the first semiconductor integrated circuit body, and configured to emit a radio wave at least in the X-direction;

a plurality of second antenna elements, arranged on an edge of the X-directional side of the second semiconductor integrated circuit body, and configured to emit a radio wave at least in the X-direction, wherein the plurality of first antenna elements is arranged in the Z-direction, the plurality of second antenna elements is arranged in the Z-direction, and the first semiconductor integrated circuit body is provided at a position offset, with a certain distance in the Z-direction, from a position where at least part of the plurality of first antenna elements faces the plurality of second antenna elements in the Y-direction.

(Supplementary Note 11)

The array antenna substrate according to any one of supplementary notes 1 to 9, further comprising a plurality of third antenna elements arranged in the Z-direction and configured to emit a radio wave at least in the X-direction, wherein the base body includes a first base body and a second base body, the first antenna elements are provided in the first base body, the second antenna elements are provided in the second base body, the third antenna elements are located between the first base body and the second base body, and the first antenna elements, the second antenna elements, and the third antenna elements are sequentially located viewed in the Z-direction.

(Supplementary Note 12)

The array antenna substrate or the array antenna apparatus according to any one of supplementary notes 1 to 11, wherein a distance between one of the plurality of first antenna elements and one of the second antenna elements, the one second antenna element being adjacent to the one first antenna element in the Z-direction, is equal to or larger than one-thirds of an interval between the first antenna elements in the Z-direction and equal to or smaller than two-thirds of the interval.

(Supplementary Note 13)

The array antenna substrate or the array antenna apparatus according to any one of supplementary notes 1 to 12, wherein a distance between one of the plurality of first antenna elements and one of the second antenna elements, the one second antenna element being adjacent to the one first antenna element in the Z-direction, is equal to or larger than one-thirds of a wavelength of the radio wave emitted from the antenna elements and equal to or smaller than two-thirds of the wavelength.

(Supplementary Note 14)

The array antenna substrate or the array antenna apparatus according to any one of supplementary notes 1 to 13, wherein a distance between one of the plurality of first antenna elements and one of the second antenna elements, the one second antenna element being adjacent to the one first antenna element in the Y-direction, is equal to or larger than one-thirds of an interval between the first antenna elements in the Z-direction and equal to or smaller than two-thirds of the interval.

(Supplementary Note 15)

The array antenna substrate or the array antenna apparatus according to any one of supplementary notes 1 to 14, wherein a distance between one of the plurality of first antenna elements and one of the second antenna elements, the one second antenna element being adjacent to the one first antenna element in the Y-direction, is equal to or larger than one-thirds of a wavelength of the radio wave emitted from the antenna elements and equal to or smaller than two-thirds of the wavelength.

It is possible to increase practicality of an array antenna apparatus.

What is claimed is:

1. An array antenna substrate comprising:

a base body extending parallel to a Z-X plane in an orthogonal coordinate system X-Y-Z;

a first semiconductor integrated circuit body provided on a first surface of the base body;

a second semiconductor integrated circuit body provided on a second surface of the base body opposite to the first surface in a Y-direction;

a plurality of first antenna elements, arranged on an edge of an X-directional side of the first surface, formed in the first semiconductor integrated circuit body, and configured to emit a radio wave at least in the X-direction;

a plurality of second antenna elements, arranged on an edge of the X-directional side of the second surface, formed in the second semiconductor integrated circuit body, and configured to emit a radio wave at least in the X-direction, wherein the plurality of first antenna elements is arranged in a Z-direction, the plurality of second antenna elements is arranged in the Z-direction, and first to $n^{th}$ antenna elements of the first antenna elements and first to $n^{th}$ antenna elements of the second antenna elements are located alternately viewed in the Z-direction, respectively, and n is positive integer.

2. The array antenna substrate according to claim 1, wherein the plurality of first antenna elements and the plurality of second antenna elements are arranged at regular intervals in the Z-direction.

3. The array antenna substrate according to claim 1, comprising:

a first high-frequency circuit element extending in the-X-direction from any of the first antenna elements; and a second high-frequency circuit element extending in the-X-direction from any of the second antenna elements.

4. The array antenna substrate according to claim 3, wherein a Z-directional size of at least one of the first high-frequency circuit element and the second high-frequency circuit element is equal to or smaller than an average value of distances between adjacent ones of the first antenna elements.

5. The array antenna substrate according to claim 3, comprising feeders configured to connect the plurality of respective antenna elements and the plurality of respective high-frequency circuit elements, the feeders including a plurality of first feeders configured to connect the plurality of respective first antenna elements and the respective first high-frequency circuit elements and a plurality of second feeders configured to connect the plurality of respective second antenna elements and the respective second high-frequency circuit elements, wherein the length of the first feeders and the length of the second feeders are same.

6. The array antenna substrate according to claim 1, comprising a high-frequency circuit element extending in the X-direction from any of the antenna elements, wherein the high-frequency circuit elements are formed in the first semiconductor integrated circuit body and the second semiconductor integrated circuit body.

7. The array antenna substrate according to claim 1, wherein the first semiconductor integrated circuit body is an electric circuit having a same shape as that of the second semiconductor integrated circuit body and is provided in an orientation obtained by rotating the second semiconductor integrated circuit body 180 degrees about the X-direction.

8. The array antenna substrate according to claim 1, further comprising a plurality of third antenna elements arranged in the Z-direction and configured to emit a radio wave at least in the X-direction, wherein the base body includes a first base body and a second base body, the first antenna elements are provided in the first base body, the second antenna elements are provided in the second base body, the third antenna elements are located between the first base body and the second base body, and the first antenna elements, the second antenna elements, and the third antenna elements are sequentially located viewed in the Z-direction.

9. The array antenna substrate or the array antenna apparatus according to claim 1, wherein a distance between one of the plurality of first antenna elements and one of the second antenna elements, the one second antenna element being adjacent to the one first antenna element in the Z-direction, is equal to or larger than one-thirds of an interval between the first antenna elements in the Z-direction and equal to or smaller than two-thirds of the interval.

10. The array antenna substrate or the array antenna apparatus according to claim 1, wherein a distance between one of the plurality of first antenna elements and one of the second antenna elements, the one second antenna element being adjacent to the one first antenna element in the Z-direction, is equal to or larger than one-thirds of a wavelength of the radio wave emitted from the antenna elements and equal to or smaller than two-thirds of the wavelength.

11. The array antenna substrate or the array antenna apparatus according to claim 1, wherein a distance between one of the plurality of first antenna elements and one of the second antenna elements, the one second antenna element being adjacent to the one first antenna element in the Y-direction, is equal to or larger than one-thirds of an interval between the first antenna elements in the Z-direction and equal to or smaller than two-thirds of the interval.

12. The array antenna substrate or the array antenna apparatus according to claim 1, wherein a distance between one of the plurality of first antenna elements and one of the second antenna elements, the one second antenna element being adjacent to the one first antenna element in the Y-direction, is equal to or larger than one-thirds of a wavelength of the radio wave emitted from the antenna elements and equal to or smaller than two-thirds of the wavelength.

13. An array antenna apparatus comprising a plurality of the array antenna substrates according to claim 1.

14. An array antenna substrate comprising:

a first semiconductor integrated circuit body extending parallel to a Z-X plane in an orthogonal coordinate system X-Y-Z;

a second semiconductor integrated circuit body extending parallel to the Z-X plane and opposite to the first semiconductor integrated circuit body in a Y-direction;

a plurality of first antenna elements, arranged on an edge of an X-directional side of the first semiconductor integrated circuit body, and configured to emit a radio wave at least in the X-direction;

a plurality of second antenna elements, arranged on an edge of the X-directional side of the second semiconductor integrated circuit body, and configured to emit a radio wave at least in the X-direction, wherein the plurality of first antenna elements is arranged in a Z-direction, the plurality of second antenna elements is arranged in the Z-direction, the first semiconductor integrated circuit body is provided at a position offset, with a certain distance in the Z-direction, from a position where at least part of the plurality of first antenna elements faces the plurality of second antenna elements in the Y-direction, and first to $n^{th}$ antenna elements of the first antenna elements and first to $n^{th}$ antenna elements of the second antenna elements are located alternately viewed in the Z-direction, respectively, and n is positive integer.

* * * * *